US011030821B2

United States Patent
Mizuno

(10) Patent No.: US 11,030,821 B2
(45) Date of Patent: Jun. 8, 2021

(54) IMAGE DISPLAY CONTROL APPARATUS AND IMAGE DISPLAY CONTROL PROGRAM

(71) Applicant: Alpha Code Inc., Tokyo (JP)

(72) Inventor: Takuhiro Mizuno, Tokyo (JP)

(73) Assignee: Alpha Code Inc., Tokyo (JP)

( * ) Notice: Subject to any disclaimer, the term of this patent is extended or adjusted under 35 U.S.C. 154(b) by 0 days.

(21) Appl. No.: 16/966,497

(22) PCT Filed: Sep. 11, 2019

(86) PCT No.: PCT/JP2019/035679
§ 371 (c)(1),
(2) Date: Jul. 31, 2020

(87) PCT Pub. No.: WO2020/054760
PCT Pub. Date: Mar. 19, 2020

(65) Prior Publication Data
US 2021/0005024 A1  Jan. 7, 2021

(30) Foreign Application Priority Data
Sep. 12, 2018  (JP) .............................. JP2018-170290

(51) Int. Cl.
*G06T 19/00* (2011.01)
*G06T 7/70* (2017.01)
(Continued)

(52) U.S. Cl.
CPC .......... *G06T 19/006* (2013.01); *G02B 27/017* (2013.01); *G06F 3/04815* (2013.01); *G06T 7/70* (2017.01); *G02B 2027/0138* (2013.01)

(58) Field of Classification Search
CPC ..................... G06T 19/006; G02B 2027/0138
See application file for complete search history.

(56) References Cited

U.S. PATENT DOCUMENTS 9,599,818 B2   3/2017 Yamagishi et al.
10,453,235 B2 * 10/2019 Hayashi .................... G06T 7/70
(Continued)

FOREIGN PATENT DOCUMENTS

CN      106484085 A   3/2017
JP      2005-086328 A   3/2005
(Continued)

OTHER PUBLICATIONS

Chinese Office Action dated Jan. 25, 2021 issued in Patent Application No. 201980017092.5 (7 pages).

*Primary Examiner* — Ryan R Yang
(74) *Attorney, Agent, or Firm* — Polsinelli PC

(57) ABSTRACT

A target object detecting unit 13 that detects a target object existing within a predetermined distance from an HMD 200 from a moving image of a real world captured by a camera 202 installed in the HMD 200 displaying a virtual space image and an image superimposition unit 15 that causes an image of a predetermined range including the target object to be displayed superimposed on a virtual space image are provided, and when a user performs a predetermined work with a hand within a range photographed in the camera 202 installed in the HMD 200, the captured image of the predetermined range including the hand is displayed superimposed on the virtual space image, and thus the user can appropriately perform the predetermined work while looking at the captured image displayed superimposed on the virtual space image even while wearing the HMD 200.

6 Claims, 6 Drawing Sheets

(51) Int. Cl.
  *G02B 27/01* (2006.01)
  *G06F 3/0481* (2013.01)

(56) References Cited

U.S. PATENT DOCUMENTS

| | | | | |
|---|---|---|---|---|
| 10,675,766 | B1* | 6/2020 | Niemeyer | G06F 3/011 |
| 10,921,879 | B2* | 2/2021 | Ravasz | G09G 5/377 |
| 2013/0328928 | A1 | 12/2013 | Yamagishi et al. | |
| 2016/0292922 | A1 | 10/2016 | Kasahara et al. | |
| 2016/0379413 | A1* | 12/2016 | Yamamoto | G06F 3/041 |
| | | | | 345/427 |
| 2017/0061696 | A1 | 3/2017 | Li et al. | |
| 2018/0373349 | A1 | 12/2018 | Okumura et al. | |

FOREIGN PATENT DOCUMENTS

| | | |
|---|---|---|
| JP | 2009-134693 A | 6/2009 |
| JP | 2013-257716 A | 12/2013 |
| JP | 2017-102298 A | 6/2017 |
| JP | 2018-063567 A | 4/2018 |
| WO | WO 2014/188798 A1 | 11/2014 |
| WO | WO 2015/111283 A1 | 7/2015 |

* cited by examiner

IMAGE DISPLAY CONTROL APPARATUS AND IMAGE DISPLAY CONTROL PROGRAM

CROSS REFERENCE TO RELATED APPLICATIONS

This application is a National Phase filing under 35 U.S.C. § 371 of PCT/JP2019/035679 filed on Sep. 11, 2019; which application in turn claims priority to Application No. 2018-170290 filed in Japan on Sep. 12, 2018. The entire contents of each application are hereby incorporated by reference.

TECHNICAL FIELD

The present invention relates to an image display control apparatus and an image display control program, and particularly, to a technique suitable for use in an apparatus that controls display of an image in a virtual space created for a head mounted display.

BACKGROUND ART

In recent years, a virtual reality (VR) technique which makes users to experience a virtual world created in a computer as if it were a reality has been widely used. There are various VR applications, and a technique that enables a user wearing a goggle type head mounted display (HMD) to have various virtual experiences in a three-dimensional virtual space created in the HMD by a computer is common. The VR can also present the user with a world that exceeds the constraints of reality such as a time and a space.

One of the attractions of the VR using the goggle type HMD is that the real world outside the HMD is completely shut out, so the user can be immersed in the world of the virtual reality. However, the fact that the real world is completely shut out is sometimes attractive in the VR, but it can also be a demerit. For example, when the user wears the HMD, the user is unable to see the outside world at all, and so when the user actually walks as if the user were to walk in the virtual space created in the HMD, the user may collide with the surrounding obstacles.

In the past, techniques intended for solving such problems have been proposed (for example, see Patent Documents 1 and 2). In a system disclosed in Patent Document 1, an obstacle for the user wearing the HMD is detected from an image of the outside world captured by a camera installed in the HMD, and a distance from the detected obstacle to the user is calculated. Then, a virtual object replaced from the detected obstacle is synthesized with a position corresponding to the distance to the obstacle in the virtual space displayed on the HMD.

Also in Patent Document 2, a technique in which, in an image displayed on an HMD, a virtual object corresponding to a desk is displayed superimposed on an image of a virtual space in order to inform the user that an obstacle such as a desk exists near the user is disclosed.

Patent Document 1: JP-A-2013-257716
Patent Document 2: JP-A-2017-102298

SUMMARY OF THE INVENTION

Technical Problem

According to the techniques disclosed in Patent Documents 1 and 2, the user can understand the presence position of the obstacle outside the virtual space image displayed on the HMD by the virtual object of the obstacle displayed superimposed on the virtual space image, and thus the user can act while avoiding the obstacle while wearing the HMD. Accordingly, one of the demerits of the VR associated with the complete shutout of the real world can be improved.

However, even though the techniques disclosed in Patent Documents 1 and 2 are used, there is a problem in that the user is unable to perform a work in the real world while wearing the HMD. For example, the user is unable to take a memo with the hands in order to write down interesting things as a memorandum or to operate a smartphone while looking at the virtual space image displayed on the HMD. For this reason, in the past, troublesome works of temporarily stopping the reproduction of the virtual space image, taking off the HMD, performing a predetermined work, then wearing the HMD again, and resuming the reproduction of the virtual space image are necessary.

The invention was made to solve such problems, and it is an object of the invention to enable the user to easily perform works in the real world while wearing the HMD.

Solution to Problem

In order to solve the above-described problem, in the invention, in a case in which a target object existing within a predetermined distance from a head mounted display that is displaying a virtual space image is detected from a moving image of a real world captured by a camera installed in the head mounted display, a captured image of a predetermined range including the target object is displayed superimposed on the virtual space image while the target object is being detected at a position within the predetermined distance.

Advantageous Effects of the Invention

According to the invention configured as described above, when the user performs a predetermined work with a hand in a range captured by the camera installed in the head mounted display, the captured image of the predetermined range including the hand is displayed superimposed on the virtual space image, and thus the user can appropriately perform the predetermined work while seeing the captured image displayed superimposed on the virtual space image even while wearing the head mounted display. As described above, according to the invention, the user can easily perform the work in the real world even while wearing the head mounted display.

DETAILED DESCRIPTION OF EMBODIMENTS

First Embodiment

Figure 1:
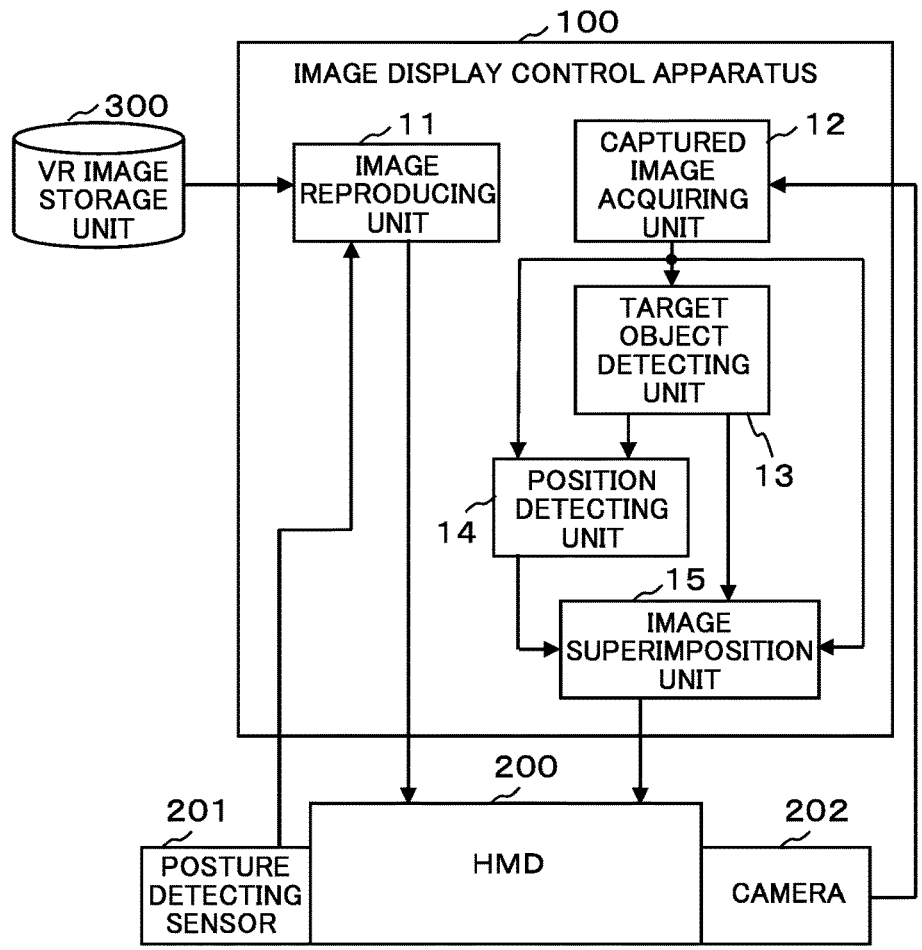
FIG. 1 is a block diagram illustrating a functional configuration example of an image display control apparatus according to a first embodiment.

Hereinafter, a first embodiment of the invention will be described with reference to the appended drawings. FIG. 1 is a block diagram illustrating a functional configuration example of an image display control apparatus 100 according to the first embodiment. The image display control apparatus 100 according to the first embodiment reproduces a virtual space image stored in a VR image storage unit 300 and causes the virtual space image to be displayed on an HMD 200. The HMD 200 includes a posture detecting sensor 201 and a camera 202. The image display control apparatus 100 according to the first embodiment controls the image to be displayed on the HMD 200 on the basis of outputs of the posture detecting sensor 201 and the camera 202.

As illustrated in FIG. 1, the image display control apparatus 100 of the first embodiment includes an image reproducing unit 11, a captured image acquiring unit 12, a target object detecting unit 13, a position detecting unit 14 and an image superimposition unit 15 as its functional configuration. Each of these function blocks 11 to 15 can be configured by any of hardware, a digital signal processor (DSP), and software. For example, when configured by software, each of the above function blocks 11 to 15 is actually configured by including a CPU, a RAM, a ROM, and the like of a computer and is implemented as an image display control program stored in a recording medium such as a RAM, a ROM, a hard disk, or a semiconductor memory operates.

The image reproducing unit 11 reproduces the virtual space image stored in the VR image storage unit 300 and causes the virtual space image to be displayed on the HMD 200. The HMD 200 displaying the virtual space image includes the posture detecting sensor 201 configured with a gyro sensor or an acceleration sensor and can detect movement of the head of the user wearing the HMD 200. The image reproducing unit 11 controls the display of the virtual space image so that the field of view of the virtual space image realized on the display of the HMD 200 dynamically changes in accordance with the movement of the head of the user detected by the posture detecting sensor 201.

The captured image acquiring unit 12 acquires the image of the real world captured by the camera 202 installed in the HMD 200. The camera 202 is installed on the front or the top of the HMD 200, and consistently photographs an area in front in the HMD 200 with a regular cycle. The captured image acquiring unit 12 acquires the image of the real world captured by the camera 202 as a moving image (a set of a plurality of frame images that are consecutive chronologically).

The target object detecting unit 13 detects the target object existing within the predetermined distance from the HMD 200 from the moving image acquired by the captured image acquiring unit 12. For example, the target object detecting unit 13 detects an object included in the frame image for each frame image of the moving image acquired by the captured image acquiring unit 12 using a known image recognition technique. Then, the target object detecting unit 13 measures the distance from the HMD 200 to the detected object using a known ranging technique, and detects only an object existing within the predetermined distance as the target object.

Here, the target object detecting unit 13 may detect all objects included in the frame image as the detection target or may detect only objects satisfying a certain condition as the detection target. For example, the target object detecting unit 13 may detect only objects that appear with a certain size or more or may detect only objects that appear in a central area excluding a predetermined range of a peripheral part of the frame image. Further, the distance to the detected object can be measured by a known method of measuring a distance to an object using a captured image by a stereo camera or a monocular camera.

Note that, although the example of measuring the distance to the object by analyzing the captured image has been described here, the invention is not limited to this method. For example, a range sensor using laser, infrared rays, ultrasonic waves, or the like may be installed in the HMD 200, and the distance to the object may be measured by the range sensor. Further, it is possible to apply various known techniques of measuring a distance to an object.

Figure 2:
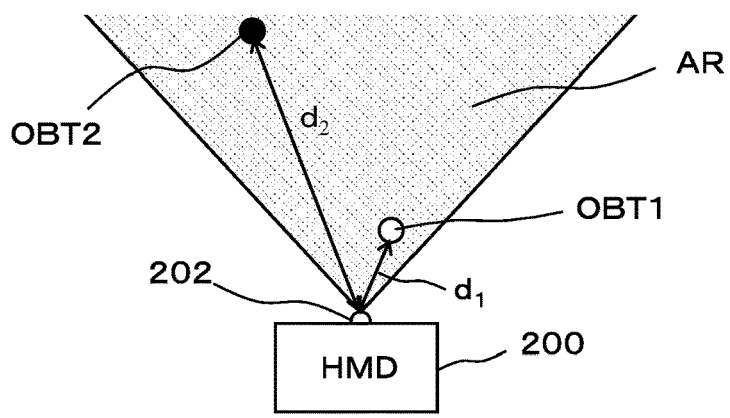
FIG. 2 is a diagram for describing processing content of a target object detecting unit according to the present embodiment.

FIG. 2 is a diagram for describing processing content of the target object detecting unit 13. In FIG. 2, a shaded area indicated by AR indicates a photography range of the camera 202 installed in the HMD 200. Objects OBT1 and OBT2 existing in this photography range AR are included in the captured image by the camera 202. Then, the captured image is acquired by the captured image acquiring unit 12. The target object detecting unit 13 detects distances d1 and d2 between the objects OBT1 and OBT2 included in the captured image acquired by the captured image acquiring unit 12 and the HMD 200 (the camera 202) and detects only the object OBT1 whose distance is a predetermined distance or less as the target object. Note that, d1≤predetermined distance and d2>predetermined distance are assumed.

The position detecting unit 14 detects a relative position of the target object detected by the target object detecting unit 13 with respect to the HMD 200. The relative position is information including a direction and a distance from the HMD 200 to the target object. The distance to the detected target object can be detected by the above-mentioned known method. Further, the direction to the detected target object can be detected by a known image recognition technique from a relation between the photography range AR and the position of the target object that is in the captured image.

Note that, although the example of analyzing the captured image and detecting the relative position of the target object has been described here, the invention is not limited to this method. For example, a position detecting sensor using a radar, a LiDAR, or the like may be installed in the HMD 200, and the relative position of the target object may be detected by the position detecting sensor. Further, it is possible to apply various known techniques of detecting the relative position of the target object.

The image superimposition unit 15 causes the image of the predetermined range including the target object to be displayed superimposed on the virtual space image while the target object is being detected at the position within the predetermined distance by the target object detecting unit 13. Here, the image superimposition unit 15 causes the image of the predetermined range including the target object to be displayed superimposed on the position corresponding to the relative position in the virtual space image (hereinafter, referred to as a "real world correspondence position") on the basis of the relative position of the target object detected by the position detecting unit 14. The image superimposition unit 15 performs this process for each frame image. In other words, the image superimposition unit 15 causes the captured image of the predetermined range including the target object to be displayed superimposed on the real world correspondence position of the virtual space image as the moving image.

Here, the predetermined range including the target object refers to, for example, a range of an area obtained by adding an extension area of a predetermined width in each of the horizontal direction and the vertical direction from a reference area, the reference area is a rectangular area inscribed by the contour line of the target object detected by the image recognition for the captured image (each frame image) is defined. Note that, in a case in which an extension area with a predetermined width is unable to be added in any direction since the target object is positioned in the peripheral part of the captured image, an extension area with a maximum width that can be added may be added in that direction. Hereinafter, the predetermined range including the target object set in the captured image is referred to as an "extraction range."

In a case in which only one target object within the predetermined distance from the HMD 200 is detected by the target object detecting unit 13, the image superimposition unit 15 may only set the extraction range for that one target object. On the other hand, in a case in which a plurality of target objects are detected by the target object detecting unit 13, and a plurality of target objects overlap or come into contact with each other on the captured image, the image superimposition unit 15 may set the extraction range for a plurality of target objects or may regard a plurality of target objects as one target object and set the extraction range for the regarded one target object. Note that, in a case in which a plurality of target objects are regarded as one target object, one of relative positions detected for a plurality of target objects is employed as the relative position of the regarded one target object with respect to the HMD 200. For example, the closest relative position from the HMD 200 is employed.

Even in a case in which a plurality of target objects are detected by the target object detecting unit 13, when a plurality of target objects are separated on the captured image, the image superimposition unit 15 sets the extraction range for a plurality of target object. Note that, in a case in which the extraction range is set for a plurality of target objects, and a plurality of extraction ranges overlap with each other, a plurality of target objects are regarded as one target object, and the extraction range may be set for the regarded target object. Alternatively, one large extraction range in which a plurality of overlapping extraction ranges are inscribed may be set. As described above, some patterns have been described about the method of setting the extraction range, but these are examples, and the extraction range may be set by other methods.

Further, the real world correspondence position is a position of the target object that is extracted from the captured image and displayed superimposed on the virtual space image in the virtual space, and refers to a position set on the virtual space so that a direction and a distance from the virtual view point of the user to the target object to be displayed in a superimposed manner in the virtual space in which the virtual space image is displayed coincide with a direction and a distance from the HMD 200 to the target object in the real world (detected by the position detecting unit 14).

Figure 3:
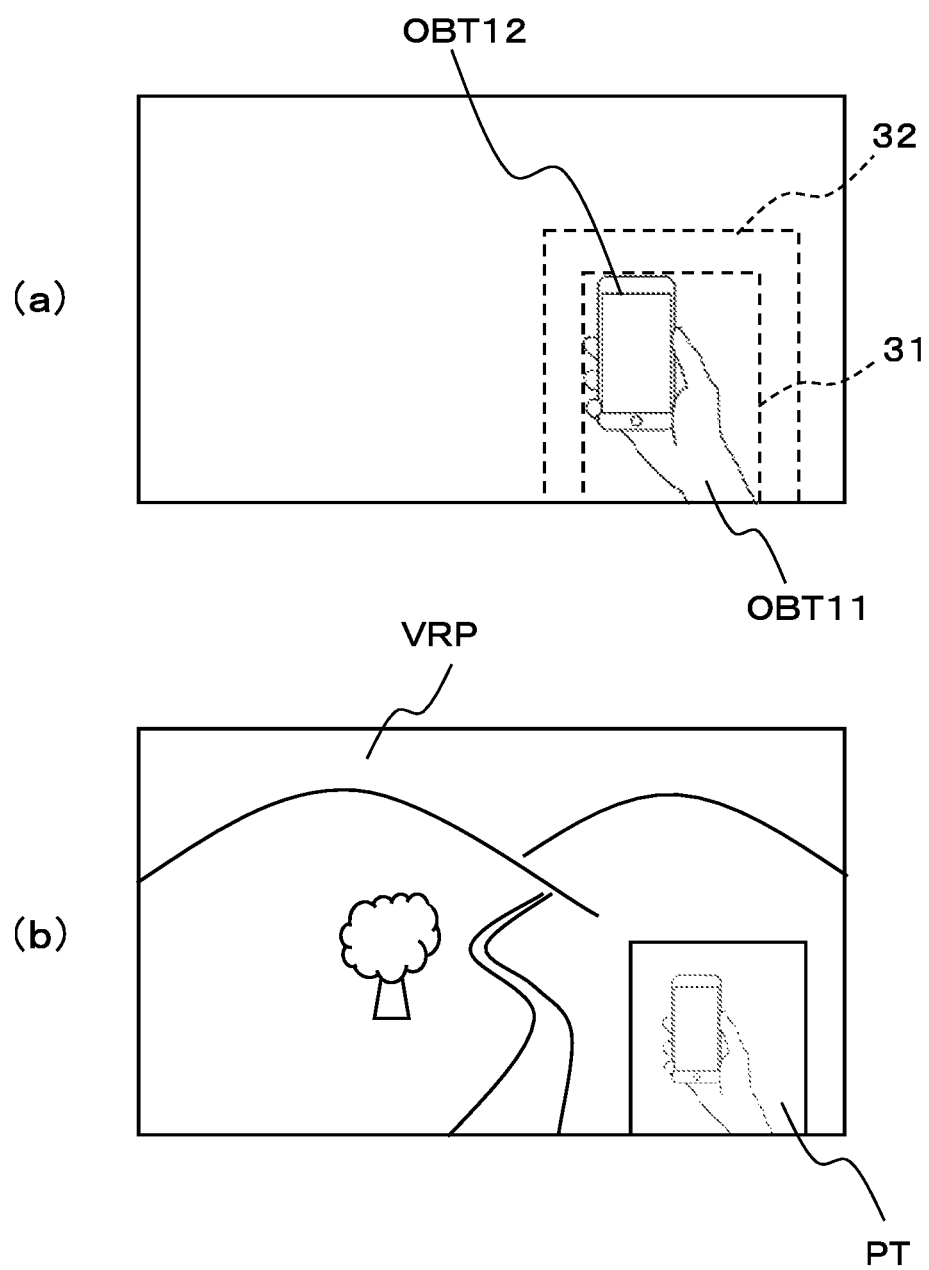
FIG. 3 is a diagram for describing processing content of an image superimposition unit according to the first embodiment.

FIG. 3 is a diagram for describing processing content of the image superimposition unit 15. Of these, FIG. 3(a) illustrates a captured image of one frame acquired by the captured image acquiring unit 12. Further, FIG. 3(b) illustrates a state in which the image of the extraction range set in the captured image is displayed superimposed on the virtual space image. Note that, in order to help with understanding here, an angle of view (a field of view) of the captured image captured by the camera 202 and an angle of view (a field of view) of the virtual space image displayed on the display screen of the HMD 200 are illustrated to be the same, but both of the angles of view need not be the same. Here, it is necessary to perform a setting so that (the angle of view of the captured image)≤(the angle of view of the virtual space image) is satisfied. In a case in which the angle of view of the virtual space image is smaller than the angle of view of the captured image, the target object that is in the peripheral part of the captured image is likely to be unable to be displayed superimposed on the real world correspondence position of the virtual space image.

A hand OBT11 of a person (the user wearing the HMD 200) and a smartphone OBT12 held by the user are in the captured image illustrated in FIG. 3(a). The human hand OBT11 and the smartphone OBT12 are target objects existing at positions within a predetermined distance from the HMD 200. Note that, objects other than the human hand OBT11 and the smartphone OBT12 (non-target objects that are not within the predetermined distance from the HMD 200) are also in the captured image, but illustration thereof is omitted. Also, it is assumed that there are no objects other than the human hand OBT11 and the smartphone OBT12 at the positions within the predetermined distance from the HMD 200.

The human hand OBT11 and the smartphone OBT12 are detected by the target object detecting unit 13 as the target objects existing within a predetermined distance from the HMD 200. Here, the human hand OBT11 and the smartphone OBT12 overlap on the captured image. Therefore, the image superimposition unit 15 regards the human hand OBT11 and the smartphone OBT12 as one target object. Then, a rectangular area inscribed by a contour line of the regarded one target object is set as a reference area 31, and an area obtained by adding an extension area in the horizontal direction and the vertical direction from the reference area 31 is set as an extraction range 32. Note that, in the example of FIG. 3(a), the extension area is not added in the downward direction. This is because the hand of the user wearing the HMD 200 appears up to the bottom edge of the captured image, so the bottom edge of the reference area 31 comes in contact with the bottom edge of the captured image, and there is no extended area therebelow.

Furthermore, as illustrated in FIG. 3(b), the image superimposition unit 15 extracts an image PT within the extraction range 32 set as described above, and causes the extracted image PT to be displayed superimposed on the real world correspondence position of the virtual space image VRP (that is, the position on the virtual space corresponding to the relative position of the target object detected in the real world by position detecting unit 14). A rectangular frame is displayed on the superimposed image PT so that it is easily understood that another image is superimposed on the virtual space image VRP.

The image superimposition unit 15 performs the process illustrated in FIG. 3 for each frame image. Accordingly, in the HMD 200, the virtual space image VRP is displayed as the moving image, and the image PT including the target object extracted from the captured image is displayed at the real world correspondence position on the virtual space image VRP while the target object (the human hand OBT11 and the smartphone OBT12) is being detected at the position within the predetermined distance from the HMD 200. Accordingly, the user can appropriately operate the smartphone without taking off the HMD 200 while seeing the captured image PT of the real world displayed as the moving image at the real world correspondence position.

Note that, although FIG. 3 has been described by taking the state in which the user holds and operates the smartphone as an example, it goes without saying that the invention is not limited to the operation of the smartphone. For example, it is possible to operate a remote controller of a home electric appliance, check a time of a wristwatch, or write a memo on a notebook without taking off the HMD 200. Also, in FIG. 3, the area obtained by adding the extension area in the horizontal direction and the vertical direction from the reference area 31 is set as the extraction range 32, but the reference area 31 may be set as the extraction range without change.

Also, the example in which the rectangular range including the target object is set as the extraction range has been described here, but the invention is not limited thereto. For example, a range clipped along the contour line of the target object (a plurality of target objects may be regarded as one target object in a case in which a plurality of target objects overlap or come in contact with each other) may be set as the extraction range.

Figure 4:
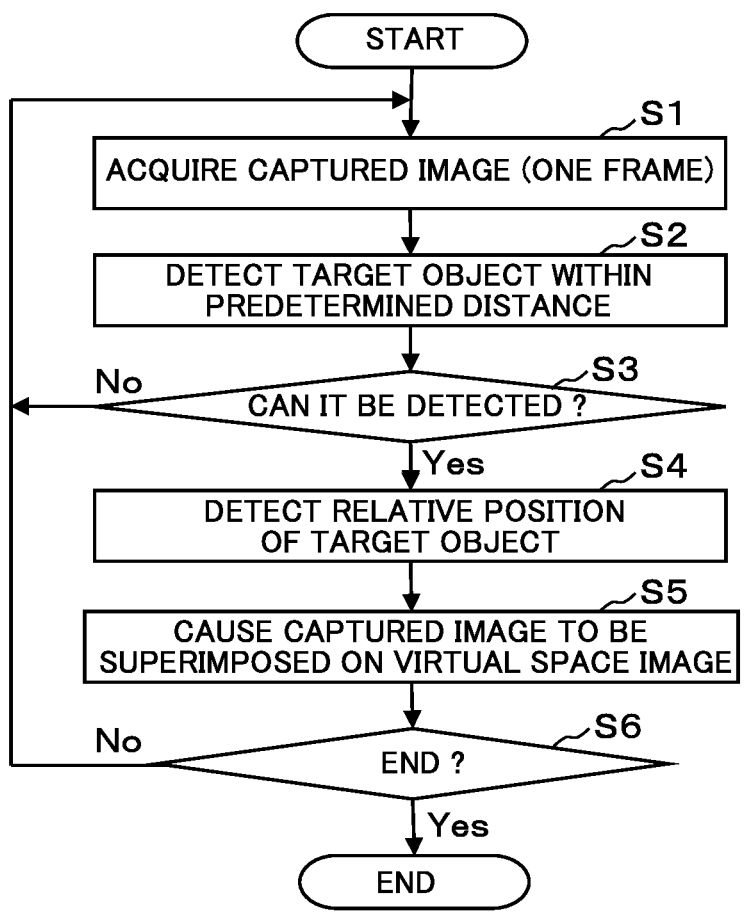
FIG. 4 is a flowchart illustrating an operation example of the image display control apparatus according to the first embodiment.

FIG. 4 is a flowchart illustrating an operation example of the image display control apparatus 100 according to the first embodiment configured as described above. The flowchart illustrated in FIG. 4 starts when the user gives an instruction to reproduce the virtual space image. Note that, the flow chart illustrated in FIG. 4 illustrates an example of a process executed by the target object detecting unit 13, the position detecting unit 14, and the image superimposition unit 15. In parallel with this, reproducing and displaying of the virtual space image are continuously performed by the image reproducing unit 11.

When the image reproducing unit 11 starts reproducing and displaying the virtual space image, the captured image acquiring unit 12 acquires an image of one frame captured by the camera 202 (step S1). Then, the target object detecting unit 13 detects the target object existing within the predetermined distance from the HMD 200 from the image acquired by the captured image acquiring unit 12 (step S2).

Then, the position detecting unit 14 determines whether or not the target object existing within the predetermined distance from the HMD 200 is detected by the target object detecting unit 13 (step S3). Here, in a case in which the target object within the predetermined distance from the HMD 200 is not detected, the process returns to step S1 and transitions to a process for a next frame of the captured image. On the other hand, when the target object within the predetermined distance from the HMD 200 is detected, the position detecting unit 14 detects the relative position of the detected target object with respect to the HMD 200 (step S4).

Then, the image superimposition unit 15 causes the image of the predetermined range (the extraction range) including the target object to be displayed superimposed on the real world correspondence position on the virtual space image (the position corresponding to the relative position) on the basis of the relative position of the target object detected by the position detecting unit 14 (step S5). Then, it is determined whether or not the reproducing of the virtual space image by the image reproducing unit 11 is completed (step S6), and in a case in which the reproducing is not completed, the process returns to step S1, and in a case in which the reproducing is completed, the process of the flowchart illustrated in FIG. 4 ends.

As described in detail above, in the first embodiment, in a case in which the target object existing within the predetermined distance from the HMD 200 is detected from the moving image of the real world captured by the camera 202 installed in the HMD 200 displaying the virtual space image, the image of the predetermined range including the target object is displayed superimposed on the real world correspondence position of the virtual space image while the target object is being detected at the position within the predetermined distance.

According to the first embodiment configured as described above, when the user performs a predetermined work with the hand within the range photographed in the camera 202 installed in the HMD 200, the captured image of the predetermined range including the hand of the user and the work target object (a smartphone, a remote controller, a wristwatch, a notepad, or the like) is displayed superimposed on the real world correspondence position of the virtual space image, and thus the user can appropriately perform the predetermined work while looking at the image displayed at the real world correspondence position even while wearing the HMD 200. Thus, according to the first embodiment, the user can simply perform the work in the real world even while wearing the HMD 200.

Note that, in the first embodiment described above, it is determined for each frame image whether or not the target object is detected at the position within the predetermined distance from the HMD 200, and when detected, the image of the extraction range is displayed superimposed on the virtual space image. Therefore, even when the user simply moves the hand within the predetermined distance from the HMD 200 or when an object simply exists at a position within the predetermined distance from the HMD 200 for a very short time, the image of the extraction range including the hand of the user or the object is displayed superimposed on the virtual space image. However, if an object existing at a position within the predetermined distance for only a short time is displayed superimposed on the virtual space image each time, the display may be annoying to the user.

Therefore, for an object existing at a position within the predetermined distance for a short time, the image of the predetermined range including that object may not be displayed superimposed on the virtual space image. In this case, the target object detecting unit 13 detects a target object that continuously exists at the position within the predetermined distance for the predetermined period of time or longer. Then, in a case in which the target object that continuously exists at the position within the predetermined distance for a predetermined period of time or longer is detected by the target object detecting unit 13, the image superimposition unit 15 causes the image of the predetermined range (the extraction range) including the target object to be displayed superimposed on the virtual space image while the target object is thereafter being detected at the position within the predetermined distance.

Second Embodiment

Figure 5:
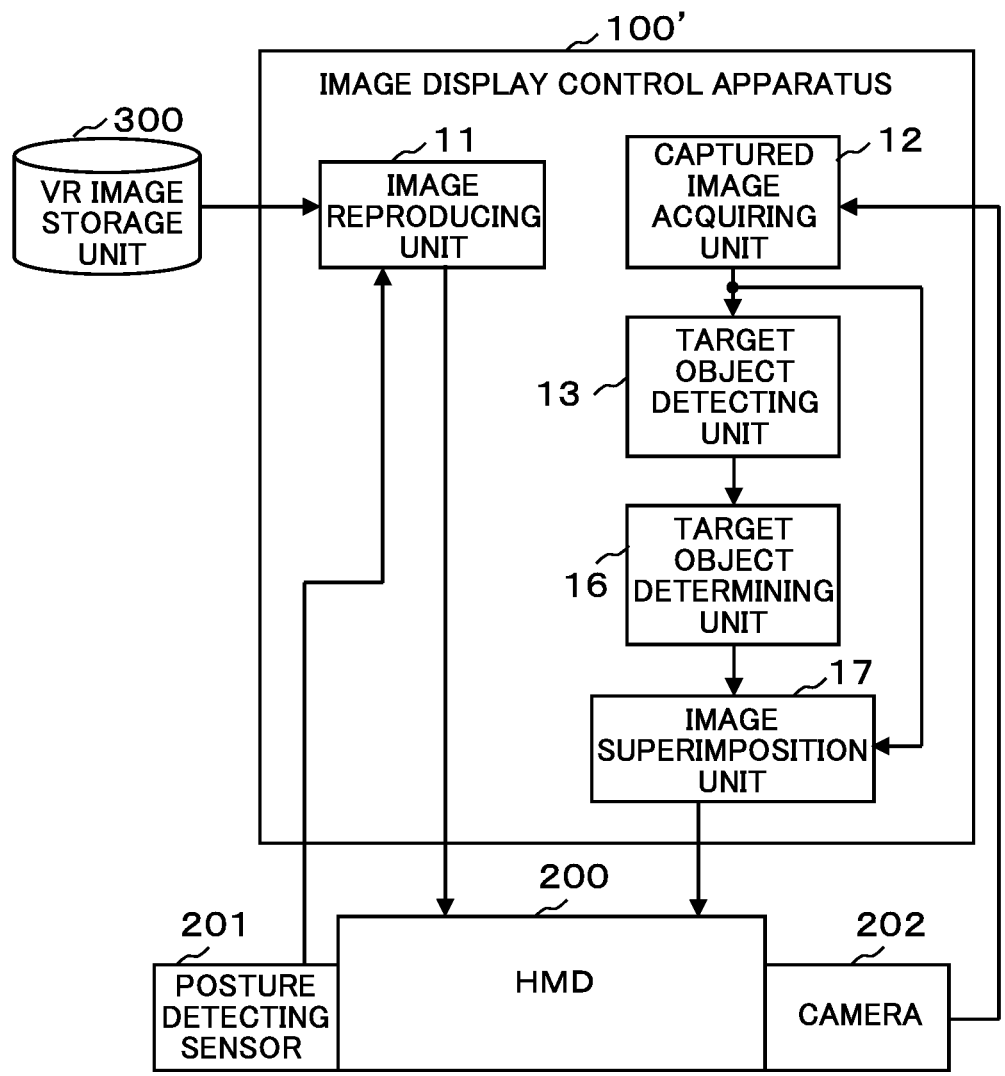
FIG. 5 is a block diagram illustrating a functional configuration example of an image display control apparatus according to a second embodiment.

Next, a second embodiment of the invention will be described with reference to the appended drawings. FIG. 5 is a block diagram illustrating a functional configuration example of an image display control apparatus 100' according to the second embodiment. Note that, in FIG. 5, blocks denoted by the same reference numerals as those illustrated in FIG. 1 have the same functions, and therefore, duplicate description will be omitted here. As illustrated in FIG. 5, the image display control apparatus 100' according to the second embodiment includes a target object determining unit 16 and an image superimposition unit 17 in place of the position detecting unit 14 and the image superimposition unit 15 illustrated in FIG. 1.

The target object determining unit 16 determines whether or not the human hand is included in the target object detected by the target object detecting unit 13. For example, the target object determining unit 16 can determine whether or not the human hand is included in the target object detected by the target object detecting unit 13 by using a known pattern recognition technique. Alternatively, it may be determined whether or not the human hand is included in the target object detected by the target object detecting unit 13 using a learning model created by machine learning for the human hand. The target object determining unit 16 performs the determination for each frame image.

In a case in which the target object determining unit 16 determines that the human hand is included in the target object, the image superimposition unit 17 causes an image of a predetermined range including the human hand to be displayed and superimposed on a predetermined area of the virtual space image while the target object is being detected at a position within the predetermined distance from the HMD 200. The image superimposition unit 17 performs this process for each frame image. In other words, the image superimposition unit 17 causes the image of the predetermined range including the human hand to be displayed superimposed on a predetermined area of the virtual space image as a moving image.

Here, the predetermined area of the virtual space image refers to a rectangular area of a predetermined size at a predetermined position in the entire area of the display screen of the HMD 200 displaying the virtual space image. For example, a rectangular area of a predetermined size at the lower left corner of the display screen can be set. Hereafter, this is referred to as a "superimposition area."

Further, the predetermined range including the human hand refers to, for example, an area obtained by adding an extension area of a predetermined width in the horizontal direction and the upward direction from a reference area, the reference area is a rectangular area inscribed by the contour line of the human hand detected by the image recognition for the captured image (each frame image) is defined. The reason why the extension area is not added in the downward direction is that, in a case in which the hand of the user wearing the HMD 200 is in the captured image, the hand of the user appears up to the bottom edge of the captured image, so the bottom edge of the reference area comes in contact with the bottom edge of the captured image, and there is no extended area therebelow. Note that, similarly to the first embodiment, in a case in which the extension area with the predetermined width is unable to be added in either the leftward direction or the rightward direction because the target object is positioned in the peripheral part of the captured image, an extension area of a maximum width may be added within an addable range in that direction.

The extension area is added to the reference area inscribed by the contour line of the human hand so that the gripped object is also included in the predetermined range when the user grips something with the hand. In other words, it is performed to extract the image of the range including the hand of the user and the gripped object from the captured image and cause it to be displayed superimposed on a predetermined area of the virtual space image. This corresponds to the "extraction range" in the second embodiment.

The aspect ratio of the rectangle in the extraction range is preferably set to be equal to the aspect ratio of the rectangle in the superimposition area set on the virtual space image. In this case, the extension area is added to the reference area of the captured image so that the aspect ratio of the extraction range is equal to the aspect ratio of the superimposition area. However, this need not be necessarily performed. For example, an aspect ratio of an enlarged or reduced image may be set to be equal to the aspect ratio of the superimposition area by setting the extraction range by adding an extension area of a predetermined length in the horizontal directions and the upward direction from the reference area and appropriately enlarging or reducing the image within the extraction range.

Figure 6:
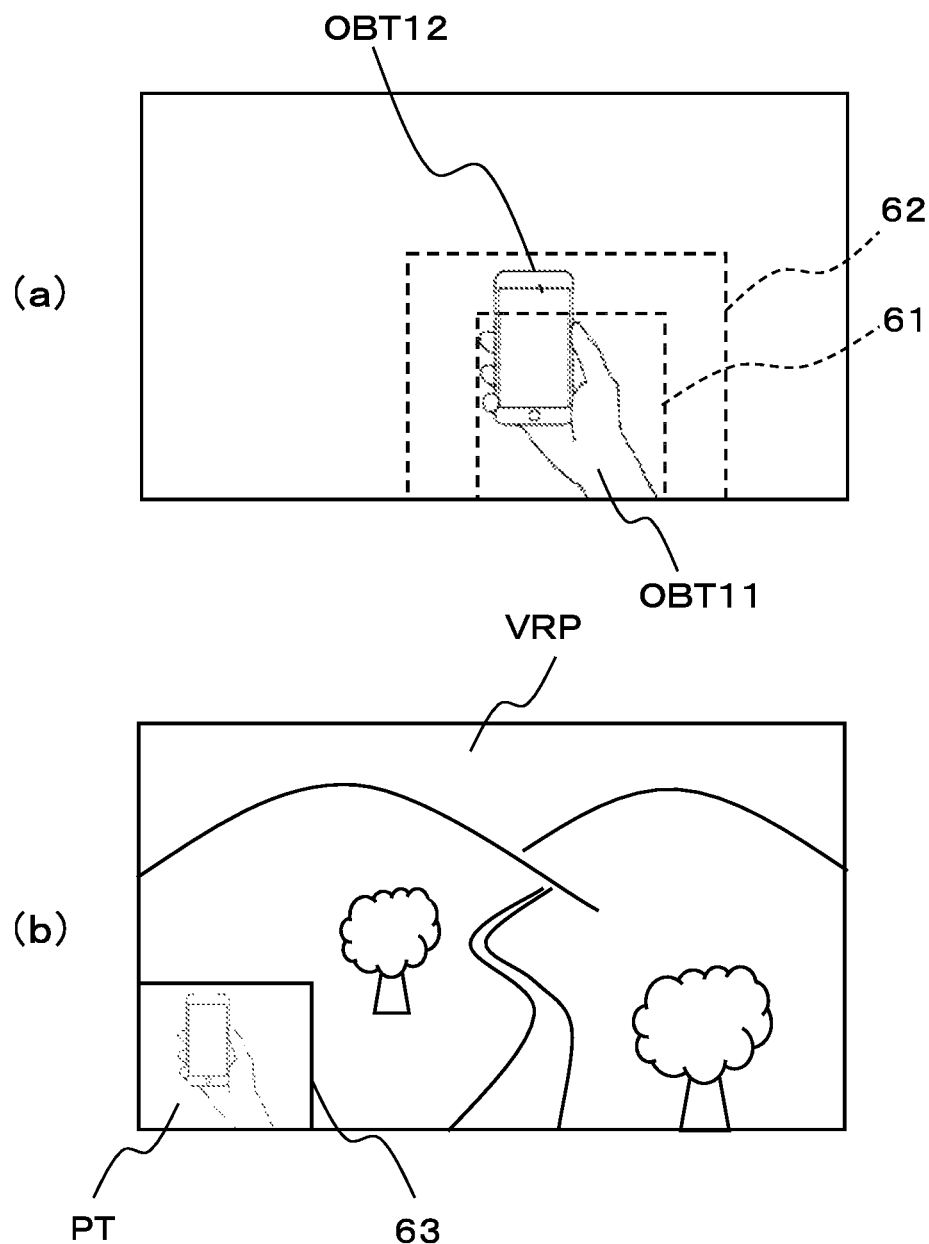
FIG. 6 is a diagram for describing processing content of an image superimposition unit according to the second embodiment.

FIG. 6 is a diagram for describing processing content of the image superimposition unit 17. Of these, FIG. 6(*a*) illustrates a captured image of one frame acquired by the captured image acquiring unit 12. Further, FIG. 6(*b*) illustrates a state in which the image of the extraction range set in the captured image is displayed superimposed on the superimposition area of the virtual space image.

A hand OBT11 of a person (the user wearing the HMD 200) and the smartphone OBT12 held by the user are in the captured image illustrated in FIG. 6(*a*). The human hand OBT11 and the smartphone OBT12 are target objects existing at positions within a predetermined distance from the HMD 200. Note that, objects other than the human hand OBT11 and the smartphone OBT12 (non-target objects that are not within the predetermined distance from the HMD 200) are also in the captured image, but illustration thereof is omitted. Also, it is assumed that there are no objects other than the human hand OBT11 and the smartphone OBT12 at positions within the predetermined distance from the HMD 200.

The human hand OBT11 is detected by the target object detecting unit 13 as a target object existing within a predetermined distance from the HMD 200, and the target object determining unit 16 determines that the target object is the human hand. The image superimposition unit 17 sets the rectangular area inscribed by the contour line of the human hand OBT11 as a reference area 61, and sets an area obtained by adding the extension area in the horizontal direction and the upward direction from the reference area 61 as an extraction range 62. As illustrated in FIG. 6(*a*), the extraction range 62 also includes the smartphone OBT12 gripped by the human hand OBT11.

Further, as illustrated in FIG. 6(*b*), the image superimposition unit 17 extracts the image PT within the extraction range 62 set as described above, and causes the extracted image PT to be displayed superimposed on a superimposition area 63 set with a predetermined size at the position of the lower left corner of the virtual space image VRP. At this time, the image PT is appropriately enlarged or reduced to correspond to the size of the superimposition area 63. A rectangular frame is displayed in the superimposition area 63 so that it is easily understood that another image is superimposed on the virtual space image VRP.

The image superimposition unit 17 performs the process illustrated in FIG. 6 for each frame image. Accordingly, in the HMD 200, the virtual space image VRP is displayed as a moving image, and the image PT including the human hand extracted from the captured image (including a gripped object when there is a gripped object) is displayed in the superimposition area 63 as a moving image while the target object is being detected at the position within the predetermined distance from the HMD 200. Accordingly, the user can appropriately operate the smartphone without taking off the HMD 200 while seeing the captured image PT of the real world displayed as the moving image at the superimposition area 63.

Note that, in a case in which the human hand present within the predetermined distance from HMD 200 is not detected as the target object from the captured image acquired by captured image acquiring unit 12, the process of image superimposition unit 17 is not executed. Therefore, in this case, only the virtual space image VRP is displayed on the entire area of the display screen on the HMD 200, and the superimposition area 63 is not set (the rectangular frame of the superimposition area 63 and the image PT are not displayed). As a result, when the user does not perform predetermined work with the hand, it is possible to display only the virtual space image VRP in an easy-to-see manner on the entire display screen without displaying the extra image. Also, instead of the user manipulating some work target object with the hand, some object accidentally exists within a predetermined distance from the HMD 200 and is detected as a target object by the target object detecting unit 13. However, the process of image superimposition unit 17 is not executed. Therefore, even in this case, only the virtual space image VRP is displayed on the entire area of the display screen on the HMD 200, and it is possible to prevent unnecessary images from being displayed and superimposed.

Note that, although FIG. 6 has also been described by taking the state in which the user holds and operates the smartphone as an example, it goes without saying that the invention is not limited to the operation of the smartphone. For example, it is possible to operate a remote controller of a home electric appliance, check a time of a wristwatch, or write a memo on a notebook without taking off the HMD 200.

Also in the second embodiment, a range clipped along the contour line of the target object (a plurality of target objects may be regarded as one target object in a case in which a plurality of target objects overlap or come in contact with each other) may be set as the extraction range. Even in this case, the rectangular superimposition area 63 may be set in the virtual space image, and the image of the range clipped along the contour line may be displayed in the superimposition area 63. Alternatively, instead of setting the rectangular superimposition area 63 in the virtual space image, the image of the range clipped along the contour line may be displayed superimposed on the virtual space image.

Figure 7:
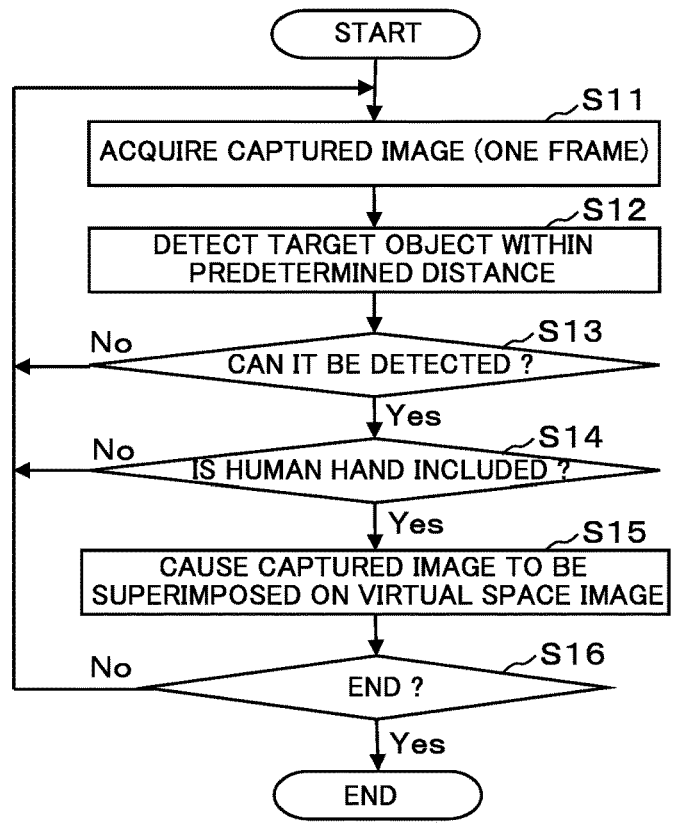
FIG. 7 is a flowchart illustrating an operation example of the image display control apparatus according to the second embodiment.

FIG. 7 is a flowchart illustrating an operation example of the image display control apparatus 100' according to the second embodiment configured as described above. The flowchart illustrated in FIG. 7 starts when the user gives an instruction to reproduce the virtual space image. Note that, the flow chart illustrated in FIG. 7 illustrates an example of a process executed by the target object detecting unit 13, the target object determining unit 16, and the image superimposition unit 17. In parallel with this, reproducing and displaying of the virtual space image are continuously performed by the image reproducing unit 11.

When the image reproducing unit 11 starts reproducing and displaying the virtual space image, the captured image acquiring unit 12 acquires an image of one frame captured by the camera 202 (step S11). Then, the target object detecting unit 13 detects the target object existing within the predetermined distance from the HMD 200 from the image acquired by the captured image acquiring unit 12 (step S12).

Then, the target object determining unit 16 determines whether or not the target object existing within the predetermined distance from the HMD 200 is detected by the target object detecting unit 13 (step S13). Here, in a case in which the target object within the predetermined distance from the HMD 200 is not detected, the process returns to step S11 and transitions to a process for a next frame of the captured image. On the other hand, when the target object within the predetermined distance from the HMD 200 is detected, the target object determining unit 16 determines whether or not the human hand is included in the detected target object (step S14).

Here, in a case in which the human hand is not included in the target object, the process returns to step S11 and transitions to the process for a next frame of the captured image. On the other hand, when it is determined that the human hand is included in the target object, the image superimposition unit 17 causes the image of the predetermined range (the extraction range) including the human hand to be displayed superimposed on a predetermined area (superimposition area) of the virtual space image (step S15). Then, it is determined whether or not the reproducing of the virtual space image by the image reproducing unit 11 is completed (step S16), and in a case in which the reproducing is not completed, the process returns to step S11, and in a case in which the reproducing is completed, the process of the flowchart illustrated in FIG. 7 ends.

As described in detail above, in the second embodiment, in a case in which the target object including the human hand existing within the predetermined distance from the HMD 200 is detected from the moving image of the real world captured by the camera 202 installed in the HMD 200 displaying the virtual space image, the image of the predetermined range including the human hand is displayed superimposed on the predetermined area of the virtual space image while the target object is being detected at the position within the predetermined distance.

According to the second embodiment configured as described above, when the user performs a predetermined work with the hand within the range photographed in the camera 202 installed in the HMD 200, the captured image of the predetermined range including the hand is displayed superimposed on the predetermined area of the virtual space image, and thus the user can appropriately perform the predetermined work while looking at the image displayed at the predetermined area even while wearing the HMD 200. Thus, according to the second embodiment, the user can simply perform the work in the real world even while wearing the HMD 200.

Also, in the second embodiment, in a case in which an object other than the human hand accidently exists within a predetermined distance from the HMD 200, the captured image of the predetermined range including that object is not displayed superimposed on the predetermined area of the virtual space image. Accordingly, when the user is not working with the hand, it is possible to prevent an unnecessary image from being displayed superimposed on the virtual space image and to cause only the virtual space image to be displayed easily on the entire display screen.

Note that, even in the second embodiment, similarly to the first embodiment, for an object existing within a position within the predetermined distance for a time shorter than the processing time, the image of the predetermined range including the object is prevented from being displayed superimposed on the virtual space image. Accordingly, only when the user performs a predetermined work with the hand in the range photographed by the camera 202 installed in the HMD 200, it is possible to cause the captured image of the predetermined range including the hand to be displayed superimposed on the predetermined area of the virtual space image.

In the second embodiment, although the example in which the captured image of the extraction range including the human hand is displayed superimposed on the predetermined area of the virtual space image has been described, the captured image of the extraction range including the human hand may be displayed superimposed on the real world correspondence position of the virtual space image, similarly to the first embodiment. Further, the captured image of the extraction range set as in the first embodiment may be displayed superimposed on the predetermined area of the virtual space image as in the second embodiment. Further, the captured image of the extraction range set in the range including the target object detected by the target object detecting unit 13 as in the first embodiment may be displayed superimposed on the predetermined area of the virtual space image regardless of whether or not the human hand is included as in the second embodiment.

Further, in the second embodiment, although the example in which the predetermined range including the human hand is set as the extraction range, and the captured image of the extraction range is displayed superimposed on the predetermined area of the virtual space image has been described, the invention is not limited thereto. For example, the target object determining unit 16 determines whether or not the human hand and the object gripped by the hand are included in the target object detected by the target object detecting unit 13, and in a case in which it is determined that the human hand and the gripped object are included, the image superimposition unit 17 may set the predetermined range including the human hand and the gripped object as the extraction range and cause the captured image of the extraction range to be displayed superimposed on the predetermined area of the virtual space image.

In this case, similarly to the first embodiment, the hand of the user and the gripped object may be regarded as one target object, and the extraction range may be set for the regarded one target object. For example, the range of the rectangular area inscribed by the contour lines of the human hand and the gripped object which are detected by the image recognition for the captured image may be set as the extraction range. Alternatively, the rectangular area inscribed by the contour lines of the human hand and the gripped object may be set as the reference area, and the area obtained by adding an extension area having a predetermined width in the horizontal direction and a predetermined height in the upward direction from the reference area may be set as the extraction range. As described above, in addition to the human hand, the gripped object is recognized from the captured image as well, and the range including the gripped object as well is set as the extraction range, and thus even in a case in which the gripped object is relatively large, it is possible to cause it to be certainly included within the extraction range from the gripped object.

Note that, in the example in which the target object determining unit 16 determines whether or not the human hand and the gripped object are included in the target object, in a case in which it is determined that the human hand and the gripped object are included in the target object, the image superimposition unit 17 may cause the image of the predetermined range which includes the human hand and the gripped object but does not include an object other than the human hand and the gripped object to be displayed superimposed on the virtual space image.

For example, in a case in which the range of the rectangular area is set as the extraction range as described above, when an object other than the human hand and the gripped object existing within the predetermined distance from the HMD 200 (that is, an object existing at a position whose distance from the HMD 200 is larger than the predetermined distance) appears as a distant view in the extraction range, the object of the distant view may be deleted from the image PT of the extraction range and then displayed superimposed on the virtual space image. The deleting of the object of the distant view here refers, for example, replacing the area of the object detected by the image recognition with an estimated distant view image generated from an image of a distant view around it (an estimated image of a distant view in a case in which it is assumed that the object does not exist).

Alternatively, the hand of the user and the gripped object may be regarded as one target object, and the range clipped along the contour line of the regarded one target object may be set as the extraction range. In this case, the image superimposition unit 17 sets a rectangular superimposition area 63 in the virtual space image as illustrated in FIG. 6(b), and cause the image of the extraction range clipped along the contour line to be displayed in the superimposition area 63 as described above. Note that, instead of setting the rectangular superimposition area 63, the image of the extraction range clipped along the contour line may be displayed superimposed on the virtual space image.

Also, in the example in which the predetermined range including the human hand and the gripped object is set as the extraction range, in a case in which the target object detected by the target object detecting unit 13 includes the human hand but does not include the gripped object, the process of extracting a part of the captured image and causing it to be superimposed on the virtual space image may not be performed. This is because the hand of the user is likely to be accidentally photographed in a situation in which the user is not performing a required operation on the gripped object. On the contrary, even in a case in which the human hand is included in the target object detected by the target object detecting unit 13, but the gripped object is not included, the image of the predetermined range including the human hand may be extracted and superimposed on the virtual space image, similarly to the second embodiment. This is because for example, it is likely that a wristwatch-type wearable terminal other than the gripped object is being operated.

Also, in the second embodiment above, although the example in which the superimposition area is set at the fixed position of the virtual space image (the position of the lower left corner in the example of FIG. 6) has been described, the position of the superimposition area may be set to be changeable by the user's intension. For example, a line of sight detecting sensor is installed in the HMD 200. Then, the image superimposition unit 17 changes the position of the predetermined area (superimposition area) when the captured image of the predetermined range (the extraction range) is superimposed on the virtual space image in accordance with the line of sight of the user detected by the line of sight detecting sensor.

Figure 8:
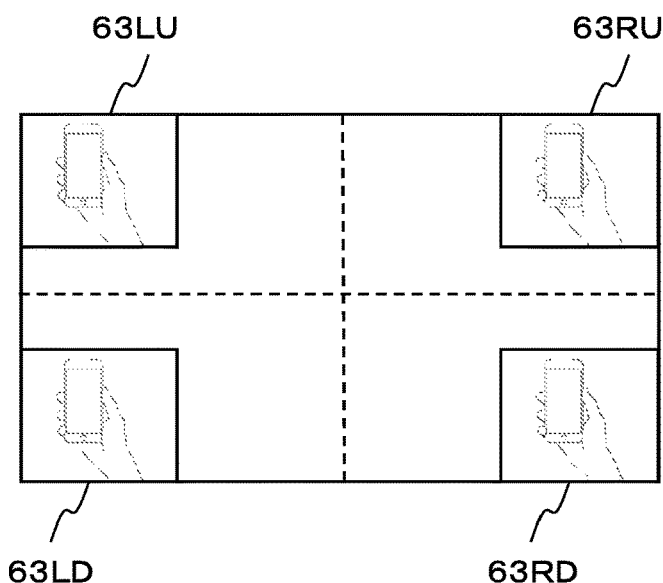
FIG. 8 is a diagram for describing a modified example in which a superimposition area is variably set in the second embodiment.

For example, as illustrated in FIG. 8, the entire area of the virtual space image is divided into four vertical and horizontal quadrants, and the superimposition area is set in a corner of a quadrant at which the line of sight of the user is positioned. In other words, when it is detected by the line of sight detecting sensor that the user directs the line of sight toward the upper right quadrant, the image superimposition unit 17 sets a superimposition area 63RU at the position of the upper right corner of the virtual space image. When it is detected by the line of sight detecting sensor that the user directs the line of sight toward the lower right quadrant, the image superimposition unit 17 sets a superimposition area 63RD at the position of the lower right corner of the virtual space image. When it is detected by the line of sight detecting sensor that the user directs the line of sight toward the upper left quadrant, the image superimposition unit 17 sets a superimposition area 63LU at the position of the upper left corner of the virtual space image. When it is detected by the line of sight detecting sensor that the user directs the line of sight toward the lower left quadrant, the image superimposition unit 17 sets a superimposition area 63LD at the position of the lower left corner of the virtual space image.

Further, in the first and second embodiments, although the example in which the image display control apparatus 100 or 100' and the HMD 200 are configured separately have been described, the HMD 200 may be configured to include the image display control apparatus 100 or 100'. In this case, the VR image storage unit 300 may also be included in the HMD 200.

Besides, the first and the second embodiments described above are merely examples of specific embodiments for carrying out the invention, and the technical scope of the invention is not intended to be limitedly interpreted by them. In other words, the invention can be implemented in various forms without departing from its gist or its main features.

REFERENCE SIGNS LIST

11 Image reproducing unit
12 Captured image acquiring unit
13 Target object detecting unit
14 Position detecting unit
15, 17 Image superimposition unit
16 Target object determining unit
100, 100' Image display control apparatus
200 HMD
201 Posture detecting sensor
202 Camera

The invention claimed is:

1. An image display control apparatus, comprising:
an image reproducing unit that reproduces a virtual space image and causes the virtual space image to be displayed on a head mounted display;
a target object detecting unit that detects a target object existing within a predetermined distance from the head mounted display from a moving image of a real world captured by a camera installed in the head mounted display;
an image superimposition unit that causes an image of a predetermined range including the target object to be displayed superimposed on the virtual space image while the target object is being detected at a position within the predetermined distance by the target object detecting unit; and
a target object determining unit that determines whether or not a human hand and an object gripped by the hand are included in the target object detected by the target object detecting unit,
wherein the image superimposition unit does not perform image superimposition on the virtual space image in a case in which the target object determining unit determines that the human hand is not included in the target object and in a case in which the target object determining unit determines that the human hand is included in the target object, but the gripped object is not included in the target object, and causes an image of a predetermined range including the human hand and the gripped object to be displayed superimposed on the virtual space image in a case in which the target object determining unit determines that the human hand and the gripped object are included in the target object.

2. The image display control apparatus according to claim 1, wherein the image superimposition unit causes the image of the predetermined range to be displayed superimposed on the virtual space image as a moving image.

3. An image display control apparatus, characterized by comprising:
an image reproducing unit that reproduces a virtual space image and causes the virtual space image to be displayed on a head mounted display;
a target object detecting unit that detects a target object existing within a predetermined distance from the head mounted display from a moving image of a real world captured by a camera installed in the head mounted display;
an image superimposition unit that causes an image of a predetermined range including the target object to be displayed superimposed on the virtual space image while the target object is being detected at a position within the predetermined distance by the target object detecting unit; and
a target object determining unit that determines whether or not a human hand and an object gripped by the hand are included in the target object detected by the target object detecting unit,
wherein the image superimposition unit does not perform image superimposition on the virtual space image in a case in which the target object determining unit determines that the human hand is not included in the target object, causes an image of a predetermined range including the human hand and the gripped object to be displayed superimposed on the virtual space image in a case in which the target object determining unit determines that the human hand and the gripped object are included in the target object, and causes an image of a predetermined range including the human hand to be displayed superimposed on the virtual space image in a case in which the target object determining unit determines that the human hand is included in the target object, but the gripped object is not included in the target object.

4. A non-transitory computer readable medium storing image display control instructions which when executed cause a computer to perform operations comprising:
reproducing a virtual space image;
displaying the virtual space image on a head mounted display;
detecting a target object existing within a predetermined distance from the head mounted display from a moving image of a real world captured by a camera installed in the head mounted display;
determining whether the detected target object includes a human hand and the human hand is gripping an object; and
superimposing, in response to determining the detected target object includes a human hand and the human hand is gripping an object, an image of a predetermined range including the target object on the virtual space image while the target object is being detected at a position within the predetermined distance;

wherein the instructions instruct the computer to not superimpose the image of the predetermined range in response to the human hand not being included in the target object;

wherein the instructions instruct the computer to not superimpose the image of the predetermined range in response to the human hand not gripping an object.

5. A non-transitory computer readable medium storing image display control instructions which when executed cause a computer to perform operations comprising:

reproducing a virtual space image;

displaying the virtual space image on a head mounted display;

detecting a target object existing within a predetermined distance from the head mounted display from a moving image of a real world captured by a camera installed in the head mounted display;

determining whether the detected target object includes a human hand and the human hand is gripping an object;

superimposing, in response to predetermined criteria, an image of a predetermined range including the target object on the virtual space image while the target object is being detected at a position within the predetermined distance;

the predetermined criteria comprising:

the human hand and the gripped object are included in the target object; and the human hand is included in the target object, but the gripped obj ect is not included in the target object;

wherein the instructions instruct the computer to not superimpose the image of the predetermined range in response to the human hand not being included in the target object.

6. The medium of claim 5, wherein the image of the predetermined range is a moving image.

* * * * *